US008503193B2

(12) United States Patent
Kippley

(10) Patent No.: US 8,503,193 B2
(45) Date of Patent: Aug. 6, 2013

(54) OPEN LOOP DC TO DC CONVERTERS WITH ENABLE/DISABLE CIRCUITS

(75) Inventor: Robert H. Kippley, Eagan, MN (US)

(73) Assignee: Astec International Limited, Kwun Tong, Kowloon (HK)

( * ) Notice: Subject to any disclaimer, the term of this patent is extended or adjusted under 35 U.S.C. 154(b) by 210 days.

(21) Appl. No.: 12/869,147

(22) Filed: Aug. 26, 2010

(65) Prior Publication Data

US 2012/0051096 A1 Mar. 1, 2012

(51) Int. Cl.
*H02M 3/335* (2006.01)
*H02M 7/537* (2006.01)

(52) U.S. Cl.
USPC .............. 363/17; 363/24; 363/25; 363/56.02; 363/56.06; 363/56.07; 363/95; 363/98; 363/131; 363/132; 363/133; 363/134

(58) Field of Classification Search
USPC ............. 363/17, 24, 25, 56.02, 56.03, 56.06, 363/56.07, 95, 98, 131–134
See application file for complete search history.

(56) References Cited

U.S. PATENT DOCUMENTS

| | | | | |
|---|---|---|---|---|
| 5,642,267 | A * | 6/1997 | Brkovic et al. | 363/16 |
| 5,786,990 | A * | 7/1998 | Marrero | 363/16 |
| 5,815,380 | A * | 9/1998 | Cuk et al. | 363/16 |
| 5,894,412 | A * | 4/1999 | Faulk | 363/17 |
| 5,969,484 | A * | 10/1999 | Santi et al. | 315/247 |
| 6,038,154 | A | 3/2000 | Boylan et al. | |
| 6,346,798 | B1 * | 2/2002 | Passoni et al. | 323/272 |
| 6,693,393 | B2 * | 2/2004 | Konishi et al. | 315/224 |
| 6,753,622 | B2 * | 6/2004 | Oughton, Jr. | 307/64 |
| 6,940,189 | B2 * | 9/2005 | Gizara | 307/151 |
| 7,106,039 | B1 | 9/2006 | Scott et al. | |
| 7,190,152 | B2 * | 3/2007 | He et al. | 323/282 |
| 7,202,646 | B2 | 4/2007 | Vinciarelli | |
| 7,365,998 | B2 | 4/2008 | Kumar et al. | |
| 7,375,994 | B2 | 5/2008 | Andreycak | |
| 7,391,630 | B2 * | 6/2008 | Acatrinei | 363/89 |
| 7,768,242 | B2 | 8/2010 | Wei et al. | |
| 7,872,375 | B2 * | 1/2011 | Realmuto et al. | 307/80 |
| 8,004,253 | B2 * | 8/2011 | Beltran | 323/266 |
| 8,228,048 | B2 * | 7/2012 | Spencer | 323/268 |
| 2005/0024908 | A1 * | 2/2005 | Gizara | 363/147 |
| 2006/0239049 | A1 * | 10/2006 | Melai et al. | 363/125 |
| 2007/0075654 | A1 * | 4/2007 | Kishinevsky | 315/291 |
| 2007/0176585 | A1 * | 8/2007 | He et al. | 323/282 |

(Continued)

OTHER PUBLICATIONS

"Optimized Synchronous Rectification Stage for Low Output Voltage (3.3V) DC/DC Conversion," J.A. Cobos, O. Garcia, J. Sebastian, J. Uceda and F. Aldana; PESC 1994; pp. 902-908.

*Primary Examiner* — Bao Q Vu
(74) *Attorney, Agent, or Firm* — Harness, Dickey & Pierce, P.L.C.

(57) ABSTRACT

Power supplies, power adapters, and related methods are disclosed. One example power supply includes an open loop DC to DC converter having an input for connecting to an input power source and an output for supplying a DC output voltage or current and an enable/disable circuit coupled to the open loop DC to DC converter. The enable/disable circuit is configured to enable and disable the open loop DC to DC converter as a function of the DC output voltage or current. One example method includes determining a DC output voltage or current from an open loop DC to DC converter and enabling and disabling the open loop DC to DC converter as a function of the determined DC output voltage or current.

20 Claims, 3 Drawing Sheets

206 PRE-REGULATION STAGE
202 OPEN LOOP DC TO DC CONVERTER
210 LOAD
208
ENABLE/DISABLE CIRCUIT 204
POWER ADAPTER
300

U.S. PATENT DOCUMENTS

2008/0094866 A1* 4/2008 Bauman et al. ................. 363/50
2008/0238208 A1* 10/2008 Potter et al. ..................... 307/75
2008/0310485 A1 12/2008 Soliman et al.
2010/0109571 A1* 5/2010 Nishino et al. ................ 315/307
2010/0171478 A1* 7/2010 He et al. ........................ 323/282
2011/0316511 A1* 12/2011 Wang et al. .................. 323/285

* cited by examiner

OPEN LOOP DC TO DC CONVERTERS WITH ENABLE/DISABLE CIRCUITS

FIELD

The present disclosure relates to power supplies and power adapters and, more particularly, to power supplies and adapters having open loop DC to DC converters and enable/disable circuits.

BACKGROUND

This section provides background information related to the present disclosure which is not necessarily prior art.

A wide variety of AC to DC and DC to DC power converters are known. These converters often include one or more switching devices to selectively couple an input voltage or current to an output of the converter. The switching devices can be controlled in a number of different manners to control the output voltage or current of the converter. In an open loop converter, for example, the frequency or duty cycle of one or more switching devices is typically controlled independent of voltage or current feedback from an output of the converter. In contrast, in a closed loop converter, the frequency or duty cycle of one or more switching devices is typically controlled using voltage or current feedback from the output of the converter to regulate an output voltage or current of the converter.

SUMMARY

This section provides a general summary of the disclosure, and is not a comprehensive disclosure of its full scope or all of its features.

According to one aspect of the present disclosure, a power supply includes an open loop DC to DC converter and an enable/disable circuit coupled to the open loop DC to DC converter. The open loop DC to DC converter includes an input for connecting to an input power source and an output for supplying a DC output voltage or current. The enable/disable circuit is configured to enable and disable the open loop DC to DC converter as a function of the DC output voltage or current.

According to another aspect of the present disclosure, a method of operating a power supply having an open loop DC-DC converter is disclosed. The method includes determining a DC output voltage or current from the open loop DC to DC converter, and enabling and disabling the open loop DC to DC converter as a function of the determined DC output voltage or current.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 5A:
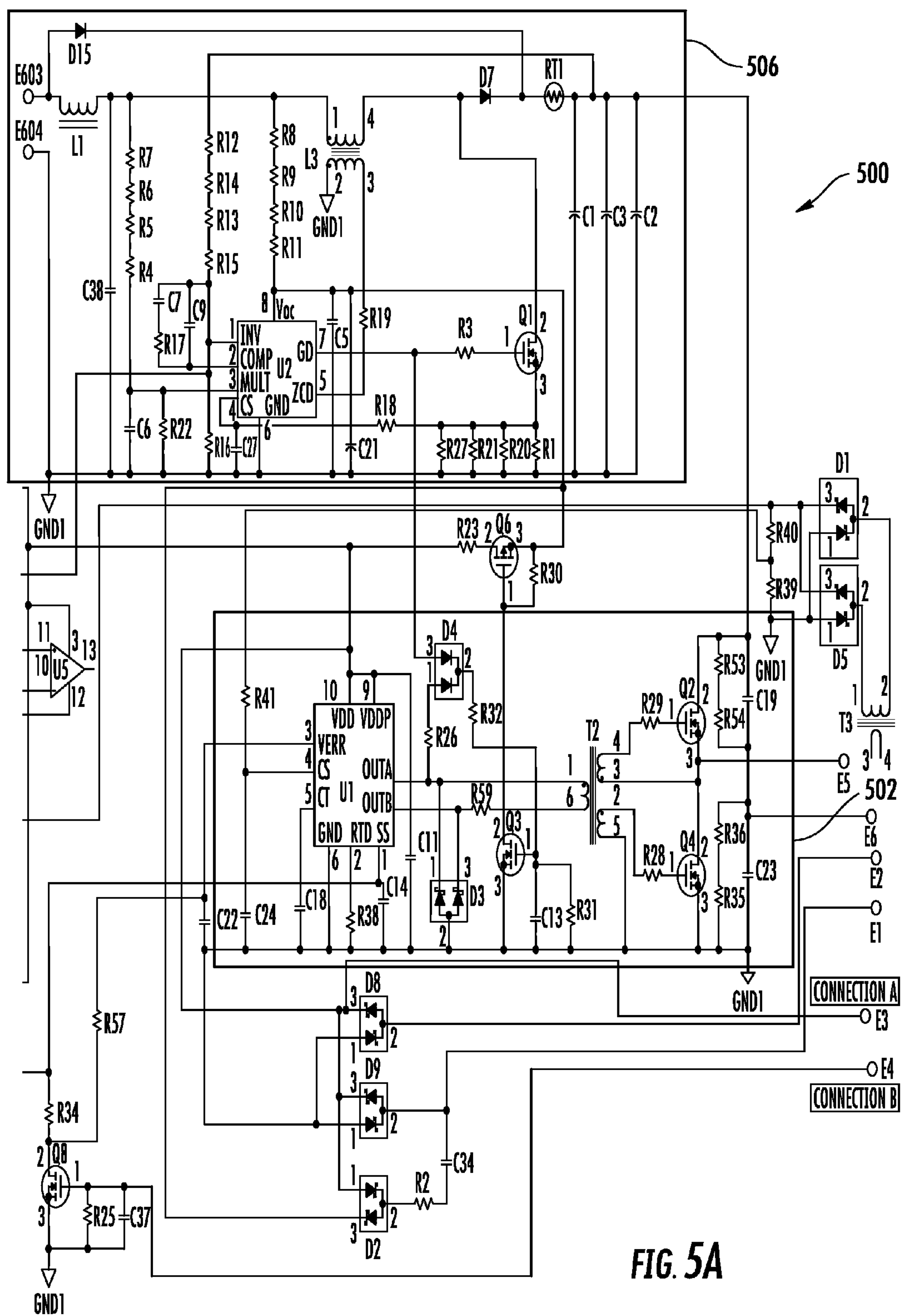
Figure 5B:
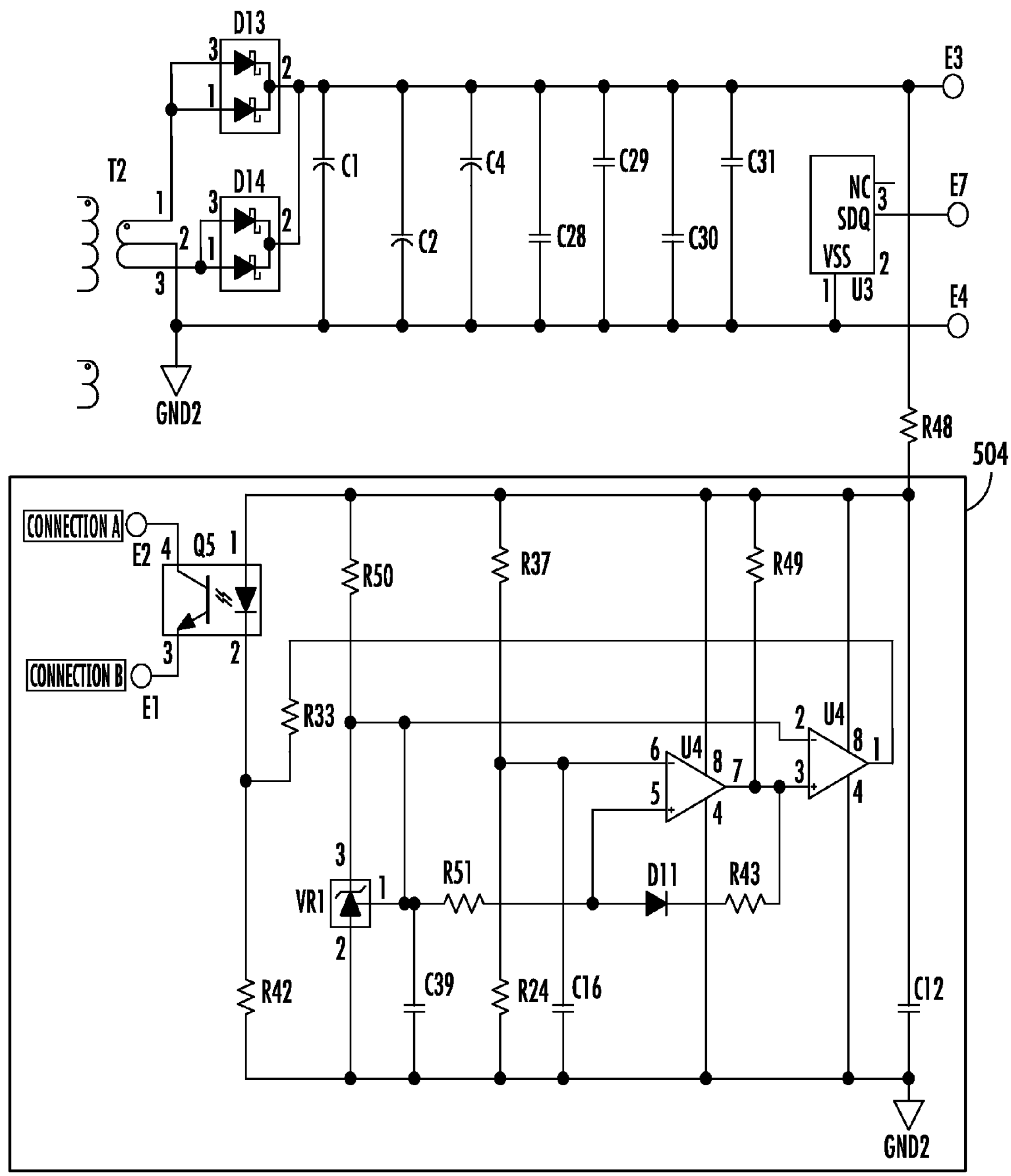

FIGS. 5A-B are schematic diagrams of a power supply according to yet another example embodiment of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

A method of operating a power supply having an open loop DC to DC converter according to one example embodiment of the present disclosure includes determining a DC output voltage or current from the open loop DC to DC converter, and enabling and disabling the open loop DC to DC converter as a function of the determined DC output voltage or current.

The DC output voltage or current may be used in any suitable manner to enable and disable the open loop DC to DC converter. For example, the method may include enabling the DC to DC converter when the output current or voltage is below a defined level and disabling the DC to DC converter when the output voltage or current is above the (same) defined level. Alternatively, the method may include enabling the DC to DC converter when the output current or voltage is below a first defined level and disabling the DC to DC converter when the output voltage or current is above a second defined level. The second defined level may be greater than the first defined level. Further, more than two defined levels may be employed for enabling and disabling the open loop DC to DC converter.

The open loop DC to DC converter may be disabled in any suitable manner, including by holding open one or more power switches in the DC to DC converter, etc. When the open loop DC to DC converter is enabled, the DC to DC converter operates in an open loop manner to selectively couple an input voltage or current to an output of the converter.

The method described above may include enabling or disabling the open loop DC to DC converter based on a load condition of the power supply. For example, the open loop DC to DC converter may be disabled only during light load (including no load) conditions.

The DC output voltage or current may be determined in any suitable manner and at any suitable location in the power supply. For example, the DC output voltage or current may be measured at the output of the open loop DC to DC converter. If the open loop DC to DC converter is an isolated converter having a transformer, the DC output voltage or current may be determined by measuring a voltage or current on a primary side or a secondary side of the transformer, and using the measured voltage or current to determine the DC output voltage or current.

The example method will typically include coupling an input power source to an input of the open loop DC to DC converter. For example, a regulated DC voltage (or current) may be supplied to the input by a pre-regulation stage employing a power factor correction (PFC) or other circuit. Alternatively, an unregulated voltage (or current) may be supplied to the input of the open loop DC to DC converter.

Some example power supplies and adapters suitable for implementing the methods of the present disclosure are illustrated in FIGS. 1-5. It should be understood, however, that the methods disclosed herein are not limited to the particular power supplies and adapters described below, and that a variety of other power supplies and adapters may be employed without departing from the scope of the present disclosure.

Figure 1:
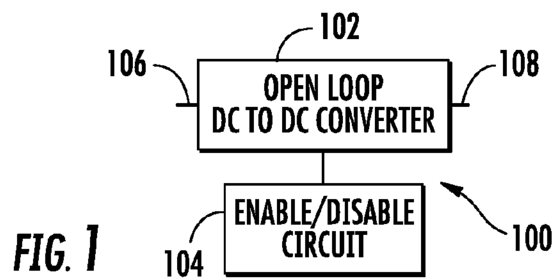
FIG. 1 is a block diagram of a power supply according to one example embodiment of the present disclosure.

A power supply according to one example embodiment of the present disclosure is illustrated in FIG. 1 and indicated generally by reference number 100. As shown in FIG. 1, the power supply 100 includes an open loop DC to DC converter 102 and an enable/disable circuit 104 coupled to the DC to DC converter 102. The open loop DC to DC converter 102 includes an input 106 for connecting to an input power source and an output 108 for supplying a DC output voltage or current (i.e., voltage, current or both). The enable/disable circuit 104 is configured to enable and disable the open loop DC to DC converter 102 as a function of the DC output voltage or current.

The enable/disable circuit 104 is configured to enable the open loop DC to DC converter 102 when the DC output voltage or current is below a defined level and disable the open loop DC to DC converter 102 when the DC output voltage or current is above the (same) defined level. Alternatively, the enable/disable circuit 104 may be configured to enable the open loop DC to DC converter 102 when the output voltage or current is below a first defined level and disable the open loop DC to DC converter 102 when the output voltage or current is above a second defined level. In some embodiments, the second defined level is greater than the first defined level. More than two defined levels may also be employed for enabling and disabling the open loop DC to DC converter 102 as desired.

Further, the defined levels for enabling and disabling the open loop DC to DC converter 102 (and other converters described herein) may be fixed or variable. These defined levels may be above, below or substantially equal to the desired DC output voltage or current of the power supply 100.

Figure 2:
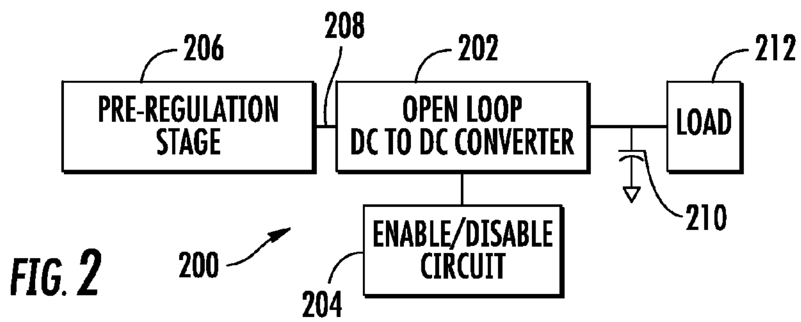
FIG. 2 is a block diagram of a power supply including a pre-regulation stage according to another example embodiment of the present disclosure.

FIG. 2 illustrates a power supply 200 according to another example embodiment. The power supply 200 includes an open loop DC to DC converter 202, an enable/disable circuit 204, and a pre-regulation stage 206 coupled to the input of the open loop DC to DC converter 202. The pre-regulation stage 206 generates a regulated DC voltage that is supplied to an input 208 of the open loop DC to DC converter 202.

In the example embodiment of FIG. 2, the pre-regulation stage 206 includes an active PFC circuit. The PFC circuit may employ a boost topology, a buck topology, or another suitable topology for providing a regulated DC voltage (or current) to the open loop DC to DC converter 202. Alternatively, the pre-regulation stage 206 may employ a passive PFC or other circuit, or may be omitted (as in the power supply 100 shown in FIG. 1).

As shown in FIG. 2, the power supply 200 also includes an output capacitor 210. During light load conditions, the output capacitor 210 is charged by the open loop DC to DC converter 202 relatively quickly, and is discharged by the load 212 relatively slowly. Accordingly, when the DC output voltage across the output capacitor 210 reaches a defined level, the DC to DC converter 202 can be disabled by the enable/disable circuit 204. While the DC to DC converter 202 is disabled, the output capacitor 210 can supply power to the load 212. Subsequently, when the DC output voltage across the output capacitor 210 falls below the defined level (or below another defined level), the open loop DC to DC converter 202 can be enabled by the enable/disable circuit 204 to supply power to the load 212 and recharge the output capacitor 210. By intermittently disabling and enabling the open loop DC to DC converter 202, losses in the converter can be reduced to thereby increase the overall efficiency of the power supply 200. As apparent to those skilled in the art, and as further explained below, the defined level(s) (i.e., thresholds) used by the enable/disable circuit 204 can also be used to control noise or ripple in the output voltage (or current) of the power supply 200.

Figure 3:
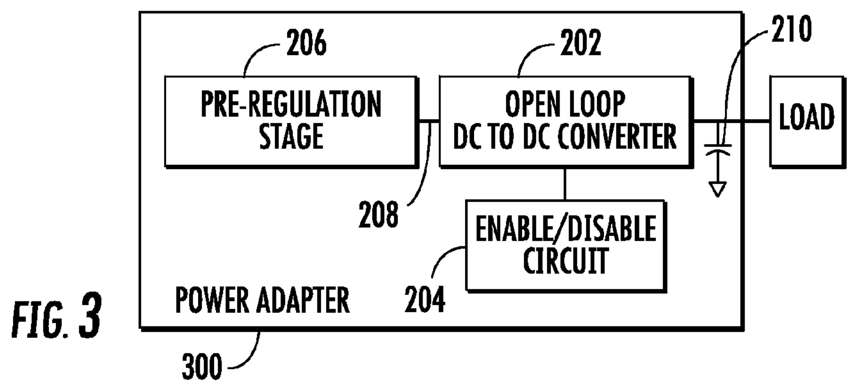
FIG. 3 is a block diagram of a power adapter employing the power supply of FIG. 2 according to another example embodiment of the present disclosure.

FIG. 3 illustrates an external power adapter 300 according to another example embodiment. The power adapter 300 may include an input power cable (not shown) for connection to an AC or DC power source, and an output power cable (not shown) for supplying DC power to various electronic devices including laptop computers, desktop computers, computer peripherals, servers, audio/video players, gaming systems, etc.

In the example embodiment of FIG. 3, the power adapter 300 is an AC to DC power adapter that includes the example power supply 200 of FIG. 2. The power rating of the power adapter 300 is about ninety watts (90 W). The PFC circuit 206 has a nominal output voltage of about 370 VDC, and an allowable output ripple of 500 mV. The nominal output voltage of the open loop DC to DC converter 202 is about 19.5 VDC. As should be apparent, other input voltages, output voltages, power ratings, output ripple, etc. may be defined as desired for any given implementation of these teachings.

Figure 4:
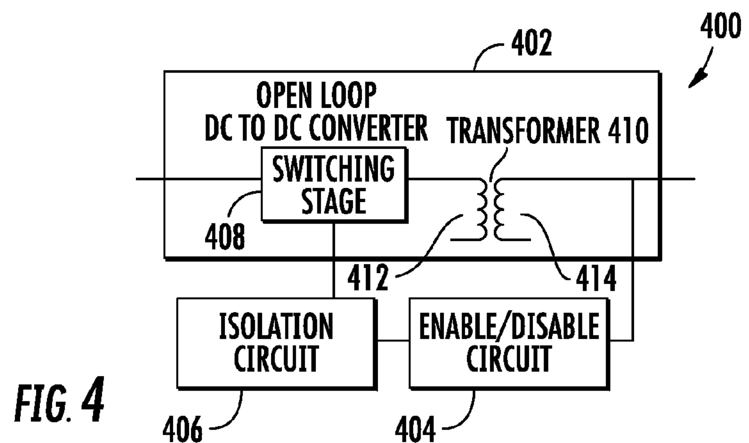
FIG. 4 is a block diagram of an isolated power supply according to another example embodiment of the present disclosure.

FIG. 4 illustrates an isolated power supply 400 according to another example embodiment of the present disclosure.

The power supply 400 includes an open loop DC to DC converter 402, an enable/disable circuit 404 and an isolation circuit 406. The open loop DC to DC converter 402 includes a switching stage 408 and a transformer 410 having a primary winding 412 and a secondary winding 414. The switching stage 408 is connected between an input of the converter 402 and the primary winding 412. The enable/disable circuit 404 is coupled to the secondary winding 414 to determine the DC output voltage or current from the secondary side of the transformer 410. The enable/disable circuit 404 is coupled to the switching stage 408 via the isolation circuit 406 to enable and disable the open loop DC to DC converter 402.

The isolation circuit 406 provides isolation between the enable/disable circuit 404 and the switching stage 408, thereby preserving the input-output isolation between the primary and secondary sides of the transformer 410. The isolation device may be an opto-isolator or another device suitable for transmitting a signal while preserving electrical isolation.

Alternatively, and as noted above, the enable/disable circuit 404 may be configured to determine the output voltage or current from the primary side of the transformer 410. For example, the enable/disable circuit 404 may be connected to the primary winding 412 to measure a voltage or current that is indicative of the DC output voltage or current. In that event, the isolation circuit 406 may be omitted.

As in other embodiments, the open loop converter 402 may be coupled to a pre-regulation stage (e.g., employing an active buck or boost PFC circuit) or another suitable input power source.

Each open loop DC to DC converter described herein may be configured to operate exclusively at its maximum duty cycle, i.e., between about 95-100% duty cycle. By operating the DC to DC converter in open loop mode, the switching frequency and duty cycle of its power switch(es) can be fixed, and component values can be optimized to that particular frequency and duty cycle. Accordingly, when enabled, the open loop DC to DC converter operates under substantially optimal conditions and at a high efficiency.

FIGS. 5A and 5B illustrate a power supply 500 according to another example embodiment of the present disclosure. The power supply 500 includes an open loop half-bridge converter 502, an enable/disable circuit 504 coupled to the half-bridge converter 502, and a pre-regulation stage 506 including an active boost PFC circuit.

The pre-regulation stage 506 is operable to convert an AC line voltage to a regulated DC voltage that is supplied to the open loop converter 502. This regulated DC input voltage may include some AC ripple. As a result, the output voltage (or current) of the open loop converter 502 may also include some ripple. As noted above, the enable/disable circuit 504 can be used to reduce this ripple at the output of the converter 502. During the "valleys" of the DC output voltage, the converter runs open loop. During the "peaks" of the DC output voltage, the enable/disable circuit 504 turns the converter on and off to maintain the output regulation and ripple and noise specifications. In this manner, the converter operates in an efficient open loop mode or it is off. The enable/disable circuit 504 can also protect the power supply from over-voltage (or over-current) conditions.

The teachings herein can also be applied when output ripple is not a concern. For example, an enable/disable circuit can be used to provide hiccup control only during light load conditions to improve light load efficiency. The low load condition can be detected by sensing the output load current or in any other suitable manner.

If the open loop converter runs near a 100% duty cycle, the need for output filtering can be reduced or eliminated. For this reason, the power supply 500 of FIG. 5 does not include an output inductor. In other embodiments, only a small output inductor (i.e., having an inductance of no more than about 0.001 mH) may be needed.

Each of the open loop DC to DC converters described above may include a half-bridge converter (including resonant and non-resonant half-bridge converters), or any other suitable converter. Further, each enable/disable circuit may be configured to operate as described above to provide noise regulation, ripple regulation, and/or over-voltage (or over-current) protection. During light load (including no load) conditions, the output capacitors may provide significant hold up time which allows the open loop converters to run intermittently (in a "burst mode") to reduce overall power consumption.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed:

1. A power supply comprising an open loop DC to DC converter and an enable/disable circuit coupled to the open loop DC to DC converter, the open loop DC to DC converter having an input for connecting to an input power source and an output for supplying a DC output voltage or current, the enable/disable circuit configured to intermittently enable and disable the open loop DC to DC converter as a function of the DC output voltage or current, the open loop DC to DC converter configured to operate with a fixed duty cycle and a fixed frequency that are not a function of the DC output voltage or current when the open loop DC to DC converter is enabled by the enable/disable circuit.

2. The power supply of claim 1 further comprising a pre-regulation stage for generating a regulated DC voltage, the pre-regulation stage coupled to the input of the open loop DC to DC converter.

3. The power supply of claim 2 wherein the open loop DC to DC converter comprises a half-bridge converter.

4. An external AC/DC power adapter for an electronic device, the power adapter comprising the power supply of claim 3.

5. The power supply of claim 3 wherein the pre-regulation stage comprises a power factor correction circuit.

6. The power supply of claim 5 wherein the power factor correction circuit comprises a buck converter or a boost converter.

7. An external AC/DC power adapter for an electronic device, the power adapter comprising the power supply of claim 6.

8. The power supply of claim 3 wherein the open loop DC to DC converter includes a switching stage, a transformer, and an isolation circuit, the transformer having a primary winding and a secondary winding, the switching stage connected to the primary winding, wherein the enable/disable circuit is connected to the secondary winding to determine the DC output voltage or current, and wherein the enable/disable circuit is coupled to the switching stage via the isolation circuit to enable and disable the open loop DC to DC converter.

9. The power supply of claim 3 wherein the open loop DC to DC converter includes a switching stage and a transformer having a primary winding and a secondary winding, the switching stage connected to the primary winding, wherein the enable/disable circuit is connected to the primary winding to determine the DC output voltage or current at the primary winding, and wherein the enable/disable circuit is connected to the switching stage to enable and disable the open loop DC to DC converter.

10. The power supply of claim 1 wherein the open loop DC to DC converter is configured to operate exclusively at a substantially maximum duty cycle when the open loop DC to DC converter is enabled.

11. The power supply of claim 1 wherein the enable/disable circuit is configured to enable the open loop DC to DC converter when the DC output voltage or current is below a defined level and disable the open loop DC to DC converter when the DC output voltage or current is above the defined level.

12. The power supply of claim 11 wherein the defined level is a fixed level.

13. The power supply of claim 1 wherein the enable/disable circuit is configured to enable the open loop DC to DC converter when the DC output voltage or current is below a first defined level and disable the open loop DC to DC converter when the DC output voltage or current is above a second defined level.

14. The power supply of claim 1 wherein the open loop DC to DC converter does not include an output inductor.

15. The power supply of claim 1 wherein the open loop DC to DC converter includes an output inductor having an inductance no greater than about 0.001 mH.

16. A method of operating a power supply having an open loop DC-DC converter, the method comprising determining a DC output voltage or current from the open loop DC to DC converter and intermittently enabling and disabling the open loop DC to DC converter as a function of the determined DC output voltage or current, the open loop DC to DC converter having a fixed duty cycle and a fixed frequency that are not a function of the determined DC output voltage or current when the open loop DC to DC converter is enabled.

17. The method of claim 16, further comprising supplying a regulated voltage from a power factor correction circuit to an input of the open loop DC to DC converter.

18. The method of claim 17, wherein enabling and disabling the open loop DC to DC converter includes enabling the open loop DC to DC converter when the DC output voltage or current is below a defined level and disabling the open loop DC to DC converter when the DC output voltage or current is above the defined level.

19. The method of claim 17, further comprising operating the open loop DC to DC converter at substantially maximum duty cycle when the open loop DC to DC converter is enabled.

20. The method of claim 16, wherein disabling the open loop DC to DC converter includes disabling the open loop DC to DC converter only during a light load condition.

* * * * *